United States Patent
Heudorfer et al.

(10) Patent No.: US 7,500,694 B2
(45) Date of Patent: Mar. 10, 2009

(54) SIDE AIRBAG DEVICE

(75) Inventors: Benedikt Heudorfer, Nersingen (DE); Stefan Schäfer, Erbach (DE); Holger Rist, Dornstadt (DE); Michael Kraft, Ulm (DE); Christian Weyrich, Neu-Ulm (DE)

(73) Assignee: Takata-Petri AG, Aschaffenburg (DE)

( * ) Notice: Subject to any disclaimer, the term of this patent is extended or adjusted under 35 U.S.C. 154(b) by 217 days.

(21) Appl. No.: 11/330,383

(22) Filed: Jan. 12, 2006

(65) Prior Publication Data

US 2006/0157958 A1 Jul. 20, 2006

Related U.S. Application Data

(63) Continuation-in-part of application No. 11/092,590, filed on Mar. 29, 2005.

(60) Provisional application No. 60/652,731, filed on Feb. 15, 2005, provisional application No. 60/646,487, filed on Jan. 25, 2005.

(30) Foreign Application Priority Data

Jan. 14, 2005 (DE) .................. 10 2005 002 085

(51) Int. Cl.
*B60R 21/21* (2006.01)
*B60R 21/233* (2006.01)

(52) U.S. Cl. ............................................. 280/729
(58) Field of Classification Search ............... 280/730.2, 280/743.1, 743.2, 729
See application file for complete search history.

(56) References Cited

U.S. PATENT DOCUMENTS

| | | | |
|---|---|---|---|
| 6,073,959 A | 6/2000 | Heinz et al. | |
| 6,338,498 B1 | 1/2002 | Niederman et al. | |
| 6,481,743 B1 | 11/2002 | Tobe et al. | |
| 6,695,340 B2 | 2/2004 | Gromodka et al. | |
| 6,830,262 B2 * | 12/2004 | Sonnenberg et al. | 280/730.2 |
| 6,923,471 B2 * | 8/2005 | Salzle | 280/728.2 |
| 7,004,501 B2 * | 2/2006 | Schneider et al. | 280/743.1 |
| 7,390,016 B2 * | 6/2008 | Noguchi et al. | 280/730.2 |
| 2002/0180190 A1 * | 12/2002 | Tobe et al. | 280/730.2 |
| 2003/0178831 A1 * | 9/2003 | Roberts et al. | 280/743.1 |
| 2005/0127644 A1 * | 6/2005 | Kino et al. | 280/730.2 |

FOREIGN PATENT DOCUMENTS

| | | |
|---|---|---|
| DE | 102 51 681 A1 | 5/2003 |
| DE | 103 31 133 A1 | 1/2004 |
| EP | 0 980 796 A2 | 2/2000 |
| EP | 1 484 222 A1 | 12/2004 |
| JP | 2002-012124 A | 1/2002 |

* cited by examiner

*Primary Examiner*—John Q. Nguyen
*Assistant Examiner*—Joseph Rocca
(74) *Attorney, Agent, or Firm*—Foley & Lardner LLP

(57) ABSTRACT

A side airbag device for a vehicle includes an airbag which is deployed in the event of an accident and, in the deployed state, covers a side wall section of the vehicle. In order for the airbag to reliably deploy, provision is made according to embodiments of the invention for the side airbag device to have a deployment control mechanism which deflect the airbag during its deployment around an obstacle situated in a region of a side wall section.

17 Claims, 7 Drawing Sheets

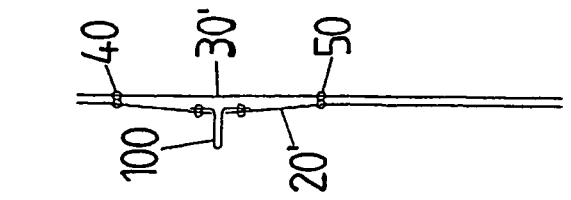
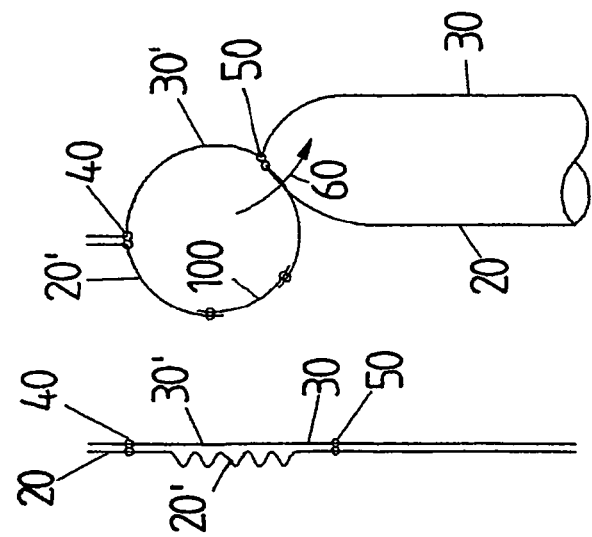
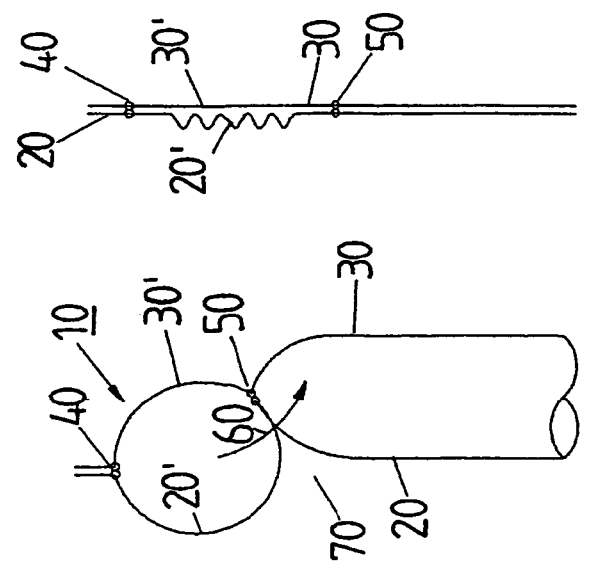
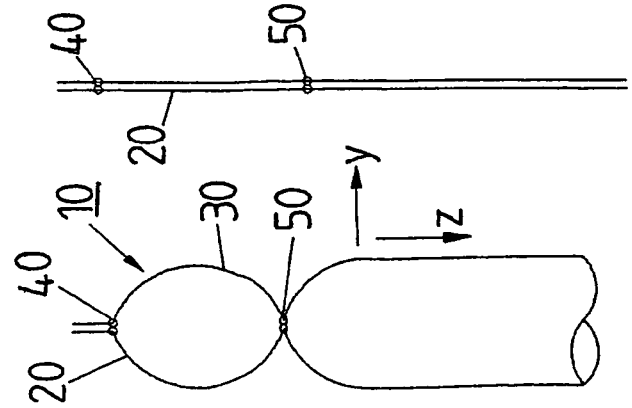

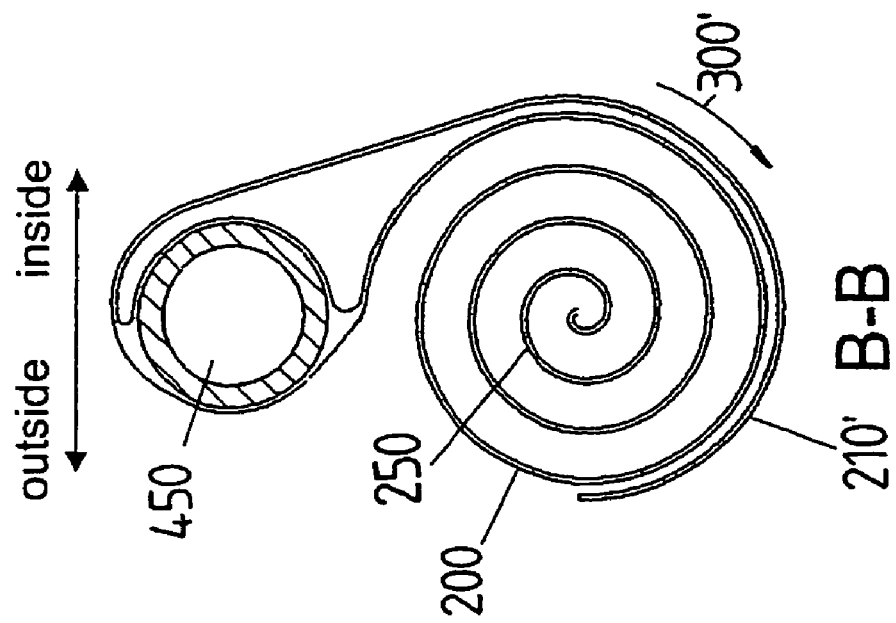
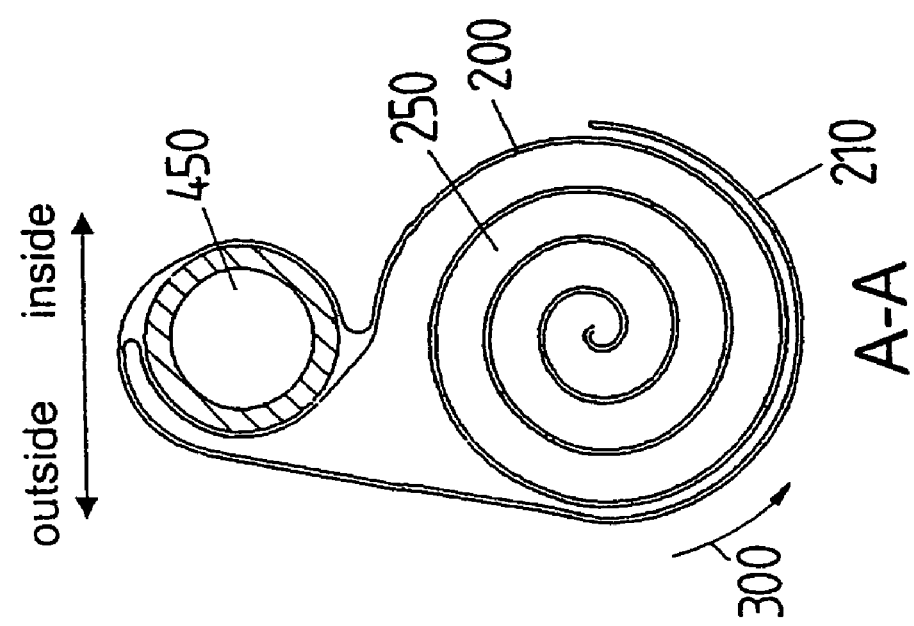

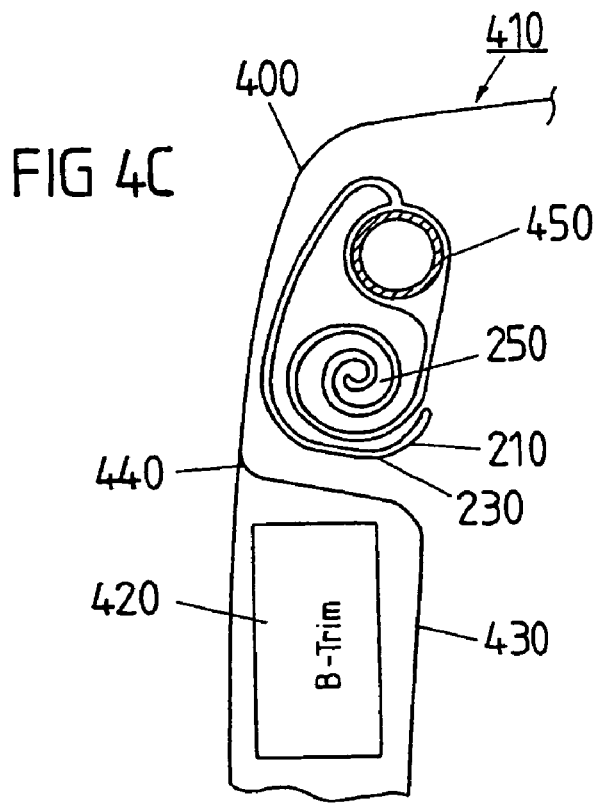
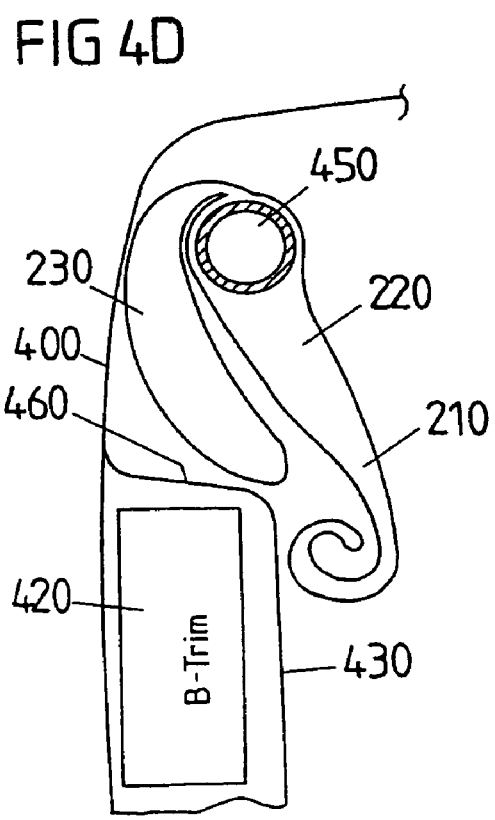
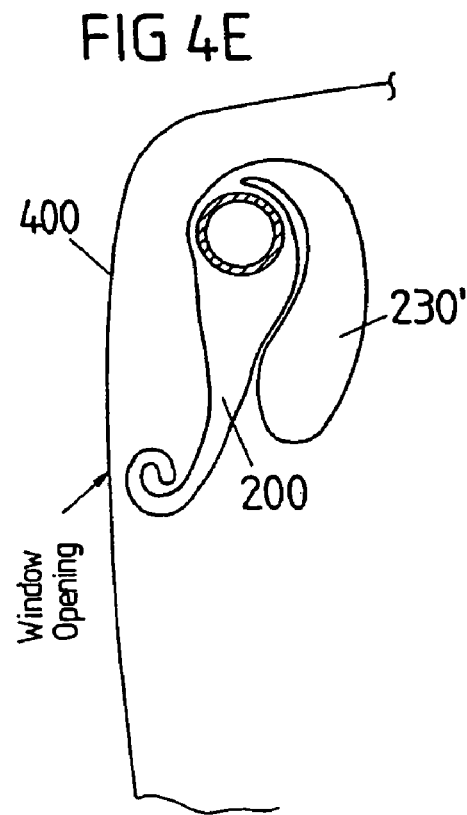

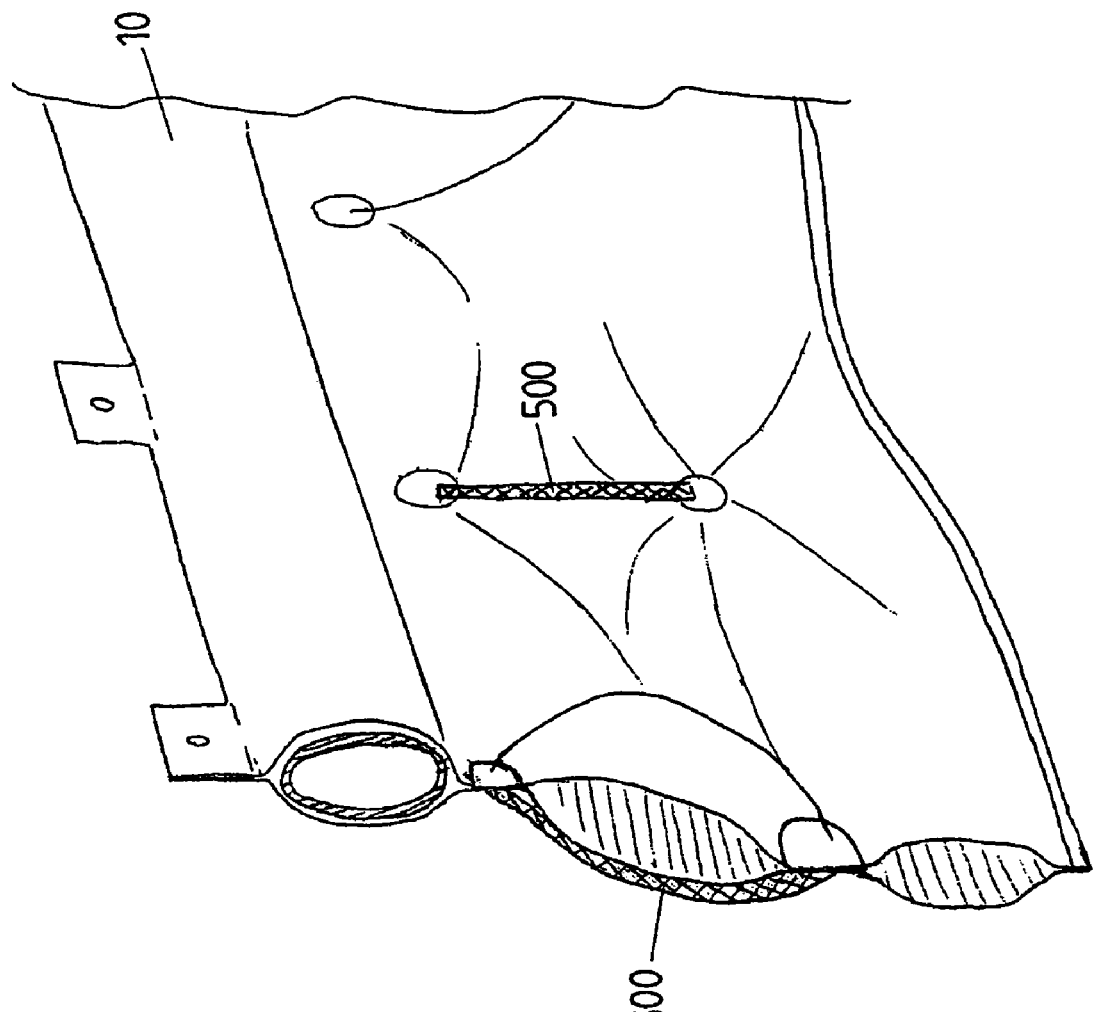

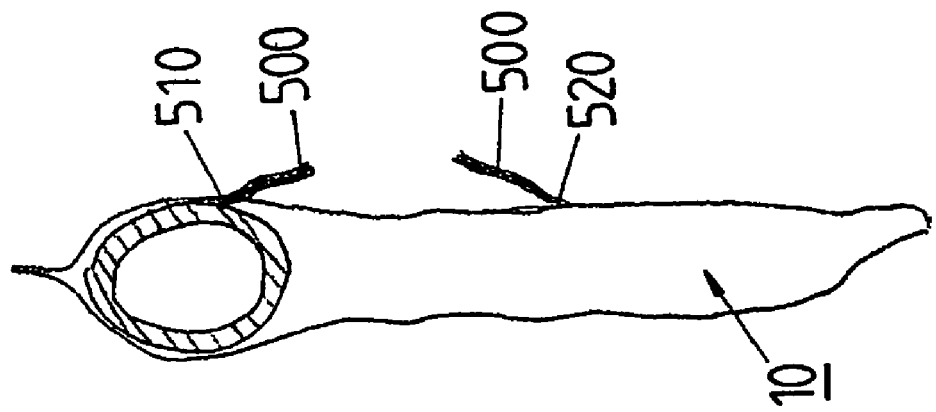
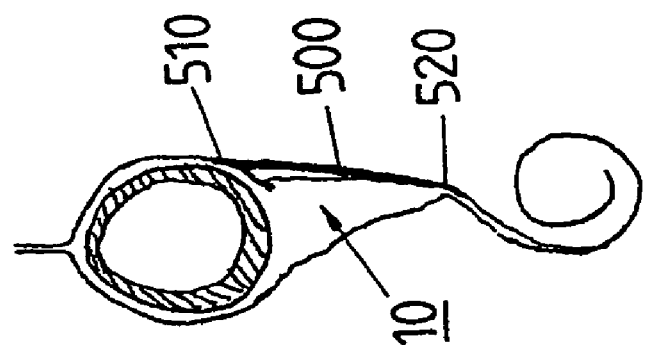
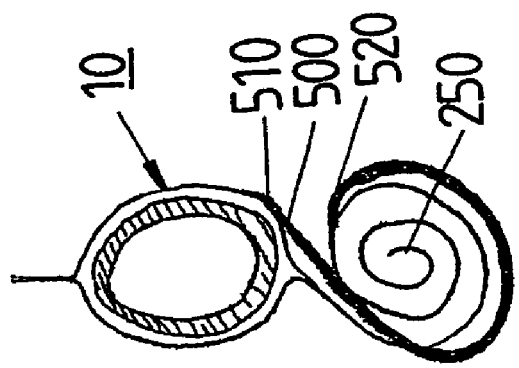

SIDE AIRBAG DEVICE

CROSS REFERENCE TO RELATED APPLICATIONS

The present application is a Continuation-in-Part of U.S. patent application Ser. No. 11/092,590, filed on Mar. 29, 2005 and claims priority to and the benefit of U.S. Provisional Application Nos. 60/646,487, filed on Jan. 25, 2005; and of 60/652,731, filed on Feb. 15, 2005.

BACKGROUND

The invention relates to a side airbag device. More specifically, the invention relates to a side airbag device including a deployment control mechanism.

A side airbag device is known, for example, from U.S. Pat. No. 6,695,340 (which is incorporated by reference herein in its entirety). To protect a vehicle occupant, this previously known side airbag device has a gas generator which, in the event of an accident, inflates an airbag of the side airbag device. In the deployed state, the airbag covers a side wall section of the vehicle, thus preventing the vehicle occupant, in particular the vehicle occupant's head, from striking against the side wall section. The airbag has, in addition to its main chamber or usable chamber covering the side wall section, projections similar to fingers which are intended to serve to prevent the main chamber from bending away from the side wall.

SUMMARY

One embodiment of the invention relates to a side airbag device for a vehicle. The side airbag device comprises an airbag which is deployed in event of an accident and, in the deployed state, covers a side wall section of the vehicle. The airbag includes a deployment control mechanism configured to deflect the airbag during deployment around an obstacle positioned in a region of the side wall section.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 1 and 1A show an example of a conventional side airbag device with a symmetrical airbag. FIG. 1 is a view of the conventional airbag in the inflated stated and FIG. 1A is a view of the conventional airbag in the uninflated state.

FIGS. 2 and 2A show a first exemplary embodiment of a side airbag device according to the invention with an asymmetric airbag formed by gathered surplus fabric. FIG. 2 is a view of the airbag in the inflated stated and FIG. 2A is a view of the airbag in the uninflated state.

FIGS. 3, 3A and 3B show a second exemplary embodiment of a side airbag device according to the invention with an asymmetric airbag in which additional fabric is used. FIG. 3 is a view of the airbag in the inflated stated, FIG. 3A is a view of the airbag in the uninflated state, and FIG. 3B is a three-dimensional view of the airbag in the inflated state.

FIGS. 4-4E show a third exemplary embodiment of a side airbag device according to the invention with two positioning chambers. FIG. 4 shows a plan view of the fabric layers of the airbag before the airbag is folded together. FIG. 4A shows the side airbag device in the section AA according to FIG. 4. FIG. 4B shows the side airbag device in the section BB according to FIG. 4. FIG. 4C shows the side airbag device in the section AA according to FIG. 4 in its state fitted in the vehicle. FIG. 4D shows the side airbag device in the section AA according to FIG. 4 in the partially deployed state. FIG. 4E shows the side airbag device in the section BB according to FIG. 5 in the partially deployed state.

FIGS. 5-5C show a fourth exemplary embodiment of a side airbag device according to the invention with a positioning strap. FIG. 5 is a view of the inflated airbag. FIG. 5A is a view of the uninflated airbag. FIG. 5B is a view of the airbag as it initially begins to deploy. FIG. 5C is a view of the airbag after a later stage of deployment.

DETAILED DESCRIPTION

Figure 3B:
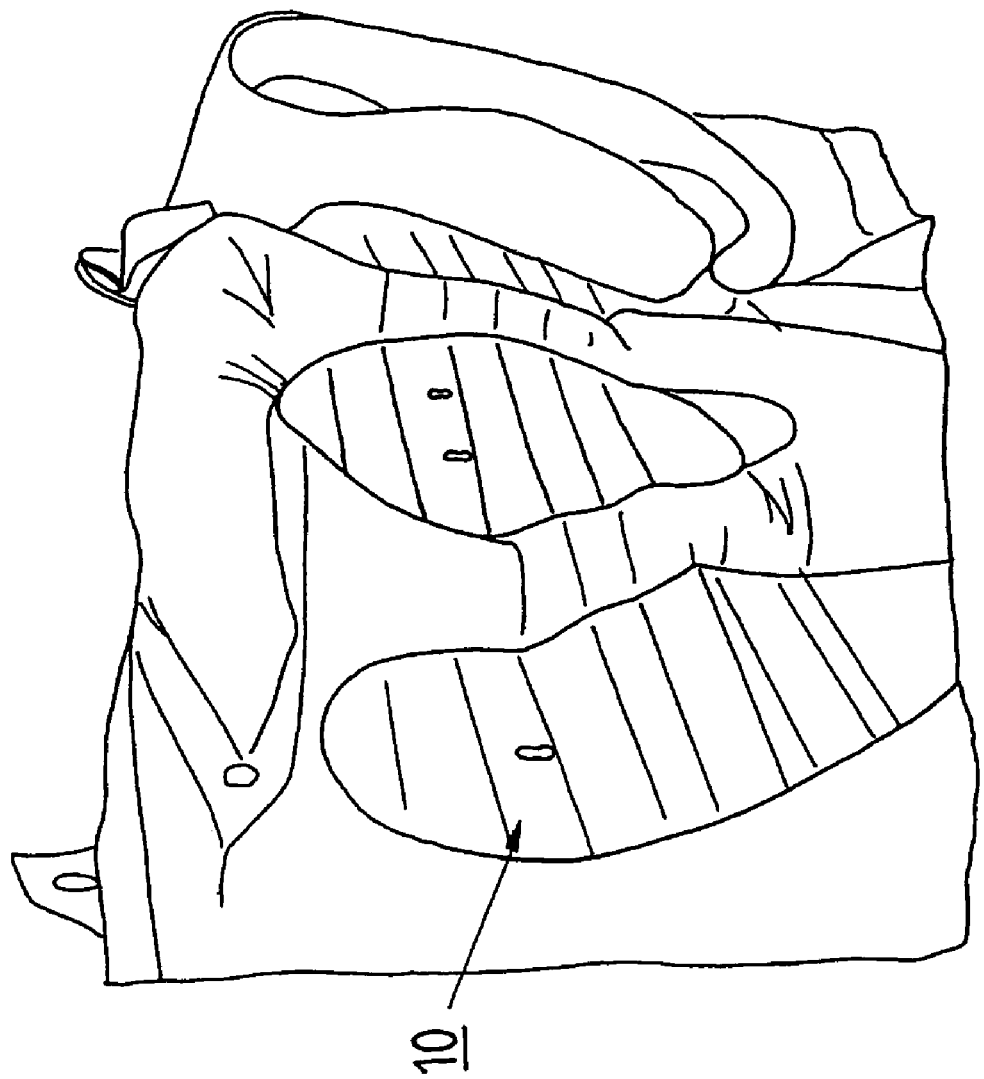

An object of the invention is to provide a side airbag device which provides a particularly high amount of safety for the vehicle occupant to be protected. In particular, it should be ensured in the case of the side airbag device that the airbag (=gas bag) is reliably deployed.

According thereto, provision is made according to embodiments of the invention for the side airbag device to have deployment control mechanism which deflects the airbag during its deployment around an obstacle situated in the region of the side wall section. The terms "side wall" and "side wall section" are understood below as meaning all types of side wall regions of a vehicle, be it the region of a vehicle pillar, a side window or any other desired region.

An advantage of the side airbag device according to embodiments of the invention can be seen in the fact that a complete and reliable deployment of the airbag may occur; this is because the airbag will "bypass" any possible obstacle because of the deployment control mechanism according to embodiments of the invention.

The vehicle pillar trim, in particular, can constitutes a considerable obstacle during the deployment of a side airbag. In the case of commercially available side airbag devices, the trim, in particular, of what is referred to as the B-pillar regularly aggravates and delays the deployment of an airbag fitted laterally in the roof region and therefore above the vehicle pillar trim. Provision is made, according to an embodiment of the side airbag device, for the deployment control mechanism to be designed in such a manner that the mechanism deflects the airbag around a vehicle pillar trim, which is an obstacle. If the gas bag is therefore fitted above the vehicle pillar trim, then the deployment control mechanism is preferably designed in such a manner that the mechanism deflects the airbag past the vehicle pillar trim during its downwardly directed deployment operation.

In order to ensure that the airbag is positioned correctly in the region outside obstacles, i.e. as closely as possible to the side wall section to be covered, the deployment control mechanism is preferably designed in such a manner that the mechanism presses the airbag in the region outside the obstacle in the direction of the side wall section.

With regard to a positioning of the airbag which is as optimum as possible, it is regarded as advantageous if the deployment control mechanism is formed by a curved configuration of the airbag; specifically, the deployed airbag is preferably curved away from obstacles in the region thereof and outside obstacles is curved towards the side wall section to be covered. The deployed airbag is accordingly therefore preferably curved in the Y-direction of the vehicle—i.e. in or counter to the Y-direction of the vehicle—and has a type of "S-shape", for example.

The curvature of the airbag can be achieved, for example, by the gas bag blank of the airbag being of asymmetrical design. If the airbag is equipped with one material layer facing the vehicle occupant and one material layer facing away from the vehicle occupant, then these two material layers can have different contours and/or can be connected asymmetrically.

In order to achieve an asymmetry and therefore a curvature of the airbag, further measures are furthermore also suitable, of which the particularly suitable measures will be explained by way of example below: for example, it is possible for at least one of the two material layers to be gathered on one side and/or for at least one of the two material layers to be shortened by inserting a material fold, in particular sewing it in or gluing it in. As an alternative or else in addition, it is possible, for example, for a folding over to be undertaken in at least one of the two material layers. As an alternative or else in addition, it is possible for additional airbag material, for example "lentil-"shaped airbag material, to be used in at least one of the two material layers.

In addition to a usable chamber covering the side wall section, the airbag particularly preferably has in addition at least one positioning chamber which, on its own or in combination with other measures—such as, for example, the explained curvatures in the airbag—forms the deployment control mechanism. For example, the positioning chamber rotates or tilts the usable chamber. In the region of a potential obstacle, the positioning chamber is preferably deployed on that side of the airbag which faces away from the vehicle occupant; the effect achieved by this is that the positioning chamber presses the usable chamber in the direction of the vehicle occupant and therefore presses it away from the obstacle.

In addition, in regions outside obstacles, additional positioning chambers can be deployed on that side of the airbag which faces the vehicle occupant in such a manner that they press the usable chamber in the direction of the side wall section to be covered. Such an arrangement of additional positioning chambers is to be recommended in regions outside obstacles in order to result in the airbag being pressed in the direction of the side wall section to be covered, and not protruding.

The positioning chamber and the usable chamber can be produced particularly simply and therefore advantageously if the airbag material of the positioning chamber and the airbag material of the usable chamber are situated on different sides of an imaginary line formed by fastening points of the airbag.

In addition, the positioning chamber may form an additional protective region by which the vehicle occupant's head is protected from striking against the roof frame of the vehicle. In this case, the positioning chamber has a "dual function", namely the function of positioning or deflecting the airbag around obstacles and, in addition, a direct protective function by covering a roof frame region of the vehicle.

The airbag may be accommodated in the side airbag device, for example, in such a manner that the material layers of the positioning chamber are folded in together with the material layers of the usable chamber; as an alternative, a separate folding of the two chambers is also possible. With regard to the folding of the airbag, it is regarded as advantageous if the material layers of the usable chamber are folded together and/or folded in zig-zag form by rollers.

The material layers of the positioning chamber(s) may be, for example, also entirely or partially wound around the folded together material layers of the usable chamber.

Otherwise, the deployment control mechanism may also comprise one or more control straps which control the deployment of the airbag. The length of a control strap of this type is preferably smaller than the distance between the fastening points of the control strap on the gas bag in its deployed state. The control straps may be, for example, folded in together with the gas bag; as an alternative, the control straps may also be folded around the folded together gas bag.

The control straps preferably tear off from the gas bag when a predefined load is exceeded; such a tearing off may be provided, for example, after the airbag has been guided, during deployment, by the particular control strap past the obstacle to be "circumnavigated" and the control straps are of no importance or would be disadvantageous for the further function of the airbag.

The invention is explained below with reference to exemplary embodiments; in the drawings.

In the figures, the same reference numbers are always used for identical or comparable components.

In FIG. 1, an airbag (gas bag) 10 according to the prior art can be seen. The airbag 10 comprises two material layers 20 and 30 of fabric, i.e. fabric layers. The two material layers 20 and 30 each have the same contour and are symmetrically sewn together, inter alia, by means of seams 40 and 50. An airbag is therefore formed which is not curved in the Y-direction of the vehicle in the deployed state and is therefore of symmetrical design with respect to its cross-sectional plane.

Since the airbag 10 is not curved in the Y-direction of the vehicle, during the deployment movement of the airbag downwards—i.e. in the Z-direction of the vehicle—the airbag 10 may strike against a vertical obstacle. If the airbag 10 is arranged, for example, above a pillar trim of the vehicle, for example above the trim of the B-pillar, then the airbag 10 may strike against this pillar trim during deployment, as a result of which the deployment of the airbag 10 is obstructed, or is at least delayed.

The material layers 20 and 30 of the airbag 10 are shown in the uninflated state once again in FIG. 1A.

FIG. 2 illustrates a first exemplary embodiment for a side airbag device according to the invention. It can be seen that the two material layers 20 and 30 are sewn together asymmetrically by the two seams 40 and 50; specifically, one section 20' of the material layer 20 is larger than that section 30' of the material layer 30 which is situated opposite this section 20'. Owing to this difference in size of the two material layers, a curvature of the airbag 10 occurs during deployment. This curvature is indicated in FIG. 2 by the reference number 60; owing to the fact that the section 30' is dimensioned to be smaller than the section 20', the airbag 10 in FIG. 2 is therefore curved to the right. If an obstacle was situated on the left side in FIG. 2, which obstacle is merely indicated by way of example by the reference number 70, then the airbag 10 would "bypass" this obstacle 70 during deployment; the deployment of the airbag 10 would therefore not be obstructed by the obstacle 70.

In the case of the exemplary embodiment according to FIG. 2, the configuration of the material layers 20 and 30 or the processing thereof—here creation of an excess fabric on one material layer side by gathering on one side of a material layer—results in the formation of a deployment control mechanism which causes a curvature of the airbag.

The two material layers 20 and 30 are shown once again in FIG. 2A in the non-inflated state of the airbag 10 for better understanding. In particular, the "gathered" material region 20' of the material layer 20 can be seen.

FIG. 3 shows a second exemplary embodiment of the invention. It can be seen that the material layer 20 is interrupted and an additional piece of fabric 100 is sewn in. This piece of fabric 100 leads to an enlargement of the section 20' of the material layer 20 and therefore to an asymmetry which is comparable in terms of effect to the asymmetry according to FIGS. 2 and 2A which is brought about by gathering one side. To be precise, an arching or curvature of the gas bag 10 is likewise brought about and is visualized by an arrow with the reference number 60. FIG. 3A shows the material layers in the state empty of gas.

FIG. 3B shows the airbag 10 according to the second exemplary embodiment in the inflated state in a three-dimensional illustration. It can be seen that the effect achieved by the asymmetry and the associated curvature of the airbag is that the airbag in some sections is at a greater distance from the vehicle side wall to be covered than at its remaining sections.

A third exemplary embodiment of the invention is now explained with reference to FIGS. 4 to 4E.

Figure 4:
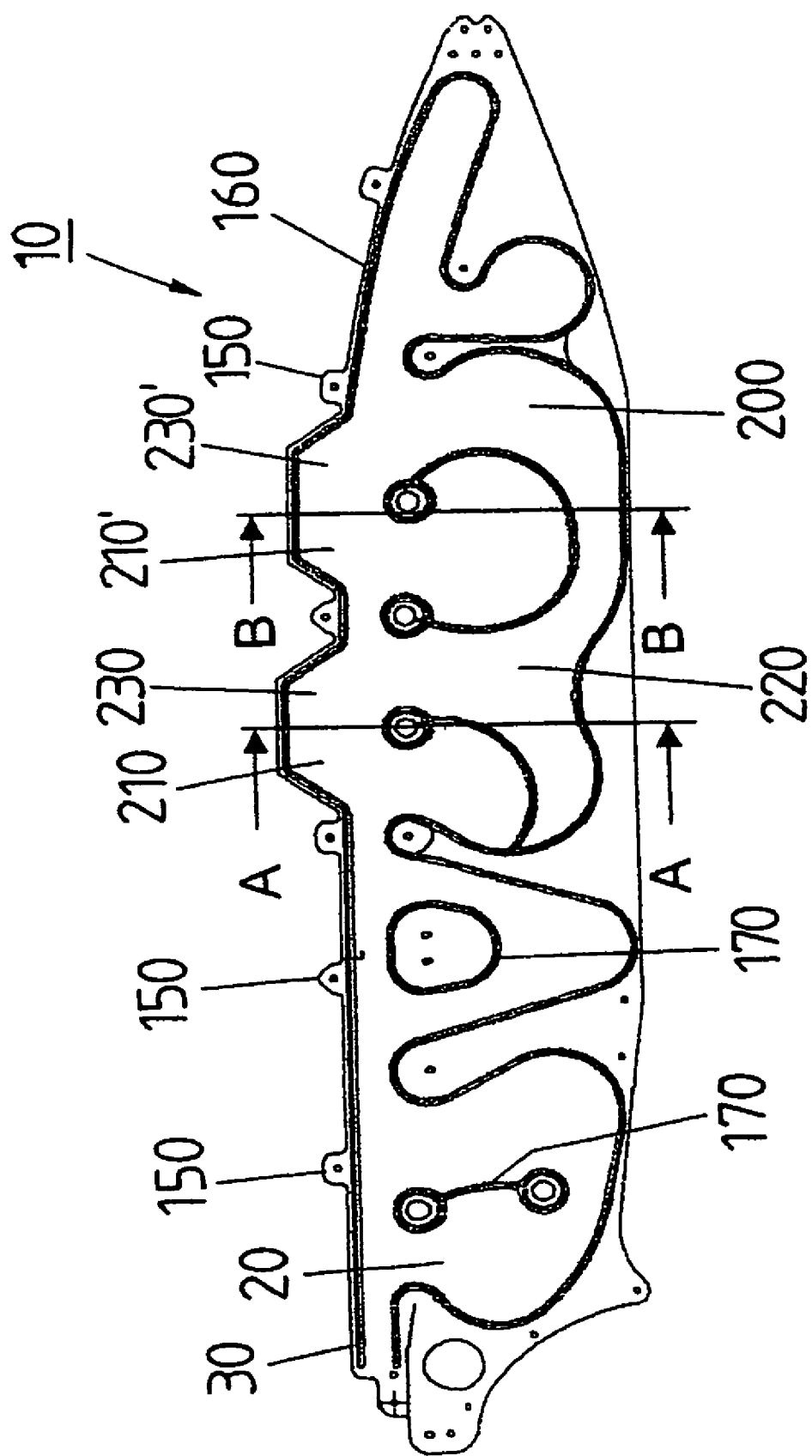

In FIG. 4, the two material layers 20 and 30 of the airbag 10 are seen in plan view. By means of fastening points 150, for example fastening holes, of the airbag 10, a fictitious or imaginary fastening line 160 is formed along which the airbag 10 is fitted, for example, in the region of a lateral roof strut of the vehicle. In addition, connecting regions 170 can be seen in FIG. 4, in which the two material layers 20 and 30 are connected to each other. The connecting regions 170 can be formed, for example, by means of seams or glued connections; in the case of seam connections, these are preferably sealed, for example with strips of silicone applied to the two material layers 20 and 30.

The two material layers 20 and 30 each have three gas bag sections which are referred to in FIG. 4 by the reference numbers 200, 210 and 210'. The gas bag sections 200 of the two material layers 20 and 30 are situated below the fastening line 160 and form a usable chamber 220 of the airbag 10. In the event of an accident, the usable chamber 220 deploys on the side wall of the vehicle and forms a section of the airbag 10 that protects the vehicle occupant.

The two gas bag sections 210 and 210' of the two material layers 20 and 30 form a deployment control mechanism; to be precise, the two gas bag sections 210 and 210', which are arranged in each case above the fastening line 160, form two positioning chambers 230 and 230' of the airbag 10. The functioning of the two positioning chambers is explained in conjunction with FIGS. 4A to 4E.

FIGS. 4A and 4B show by way of example how the material layers 20 and 30 of the airbag 10 can be folded together; FIG. 4A shows the airbag 10 in the cross section along the section line AA according to FIG. 4, and FIG. 4B shows the airbag 10 in the cross section along the section line BB according to FIG. 4. It can be seen that the gas bag sections 200 of the two material layers 20 and 30 are rolled together; as an alternative, the two gas bag sections 200 could also be folded in zig-zag form or rolled and folded in a zig-zag form.

In the case of the exemplary embodiment according to FIG. 4, the gas bag sections 210 and 210' of the two material layers 20 and 30 are not rolled together with the gas bag sections 200 but rather are placed around the material roll 250 formed from the gas bag sections 200. Of course, the gas bag sections 210 and 210' could also be placed together in another manner, for example they could be placed or rolled into the material roll 250; however, it is important that the airbag 10 can be deployed as rapidly as possible in order to ensure optimum protection for the vehicle occupant.

It can also be seen in the two FIGS. 4A and 4B that the two gas bag sections 210 and 210' are placed around the material roll 250 in different ways. The gas bag section 210 is placed counter-clockwise (arrow direction 300) around the material roll 250 and the gas bag section 210' is placed in the clockwise direction (arrow direction 300') around the material roll 250. The advantage of this different treatment of the two gas bag sections 210 and 210' is explained below in conjunction with FIGS. 4C to 4E.

In FIG. 4C, the airbag 10 is seen in the "fitted" state in the cross section along the section line AA (as seen from behind). A section 400' of a vehicle side wall 400 of a vehicle 410 (only partially illustrated) and a vehicle pillar 420 of the vehicle 410 can be seen; the vehicle pillar 420 may be, for example, a B-pillar of the vehicle 410. The vehicle pillar 420 is covered, for example for visual reasons, by a pillar trim 430 which extends as far as an upper point 440 of the side wall.

Above this upper point 440, the airbag 10 is mounted within a side airbag device of the vehicle 410. The material roll 250 and the gas bag section 210 of the positioning chamber 230 can be seen. In addition, a gas tube 450 can be seen through which gas of a gas generator (not shown) is blown into the airbag 10.

FIG. 4D shows how the airbag 10 is deployed—i.e. after an accident situation or hazardous situation occurs. It can be seen how the gas bag sections 210 of the two material layers 20 and 30 are guided around the pillar trim 430 of the vehicle pillar 420, to be precise by the positioning chamber 230 which is inflated essentially before the usable chamber 220—at least more rapidly than the usable chamber 220—and which presses the gas bag sections 210 away from the pillar trim 430. This pressing-away prevents the gas bag sections 210 from being able to impact against the upper side 460 of the pillar trim 430 and thereby obstructing and/or delaying a deployment of the usable chamber 220. In order to permit the pressing-away of the usable chamber 220, the positioning chamber 230 is deployed between the side wall 400 and the usable chamber 220; the positioning chamber 230 is therefore situated on that side of the airbag 10 which faces away from the vehicle occupant.

In order to prevent the airbag 10 from being pressed away too far from the side wall 400 by the positioning chamber 230 and reducing or preventing effective protection of the vehicle occupant, the positioning chamber 230' is provided in the region outside the B-pillar (cf. FIG. 4E); this positioning chamber 230' is—as already explained—arranged the other way around relative to the usable chamber 220 than the positioning chamber 230. The positioning chamber 230' therefore deploys on that side of the airbag 10 which faces the vehicle occupant or on that side of the airbag 10 which faces away from the side wall 400. After its deployment, the positioning chamber 230' presses the material layers 20 and 30 of the usable chamber 220 in the direction of the side wall 400 and thereby causes the airbag 10 to press against the side wall 400; FIG. 4E shows this in detail.

A pressing of the airbag 10 against the side wall 400 is preferably to be provided in all regions outside obstacles, such as the pillar trim 430, in order to achieve particularly effective protection of the vehicle occupant. It is important for the airbag 10 to be pressed against the side wall, in particular in the region of side windows of the side wall.

In order to position the airbag 10, the two positioning cushions 230 and 230' are provided in the exemplary embodiment according to FIG. 4. As an alternative or in addition, control straps—so to say—positioning straps may also be provided on the airbag 10 and are used to bring about the explained guiding of the usable chamber 220 around obstacles, such as the pillar trim 430. The control straps may be fitted in such a manner that they tear off after a predetermined maximum force is exceeded; the maximum force may be dimensioned, for example, in such a manner that tearing off occurs after the usable chamber 220 has been guided past the obstacle, for example past the B-pillar trim.

FIGS. 5 to 5C show an exemplary embodiment of an airbag 10 with positioning straps (or control straps or tensioning straps). In FIG. 5, the airbag 10 is seen in a three-dimensional illustration in the section obliquely from the side. Two of the positioning straps are referred to in each case by the reference number 500. FIG. 5A shows the airbag 10 in the cross section before inflation: the tensioning strap 500 and the material roll 250 comprising the material layers of the airbag 10 can be seen. The tensioning strap 500 is fastened to the airbag 10 at two fastening points 510 and 520.

It can be seen in FIG. 5B how the positioning strap 500 controls or influences the deployment of the airbag 10. This influence occurs, since the distance between the two fastening points 510 and 520 is greater than the length of the tensioning strap 500; the tensioning strap is therefore completely tensioned and holds the two fastening points 510 and 520 "together". This holding-together influences the deployment of the airbag 10 in such a manner that the airbag 10 is deflected, for example, around obstacles of the vehicle (e.g. the B-pillar trim).

After the airbag 10 has been guided past the interfering obstacle, the positioning strap 500 for deflecting the airbag 10 away or around is no longer required; the positioning strap 500 can therefore be designed or can be fitted to the airbag 10 in such a manner that it tears off from one or both fastening points 510 and/or 520 or tears—for example in its central region—between the two fastening points. FIG. 5C shows this by way of example.

Germany Priority Application 10 2005 002 085.2, filed Jan. 14, 2005 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A side airbag device for a vehicle comprising:
an airbag which is deployed in event of an accident and, in the deployed state, covers a side wall section of the vehicle, the airbag including at least one usable chamber covering the side wall section and first and second positioning chambers which form first and second deployment control mechanisms, the first positioning chamber is deployed on a side of the airbag facing away from a vehicle occupant and the second positioning chamber is deployed on a side of the airbag facing the vehicle occupant,
wherein the airbag is fitted above a vehicle pillar trim and the first deployment control mechanism is configured to deflect the airbag past an obstacle during deployment in a downwards direction, the obstacle being a vehicle pillar trim, and
wherein the second deployment control mechanism is configured to press the airbag in a region outside the obstacle in a direction of the side wall section.

2. The side airbag device according to claim 1, wherein the first or second deployment control mechanism is formed by the deployed airbag being shaped in a curved manner in a Y-direction of the vehicle.

3. The side airbag device according to claim 2, wherein the deployed airbag is curved away from the obstacle and outside the obstacle the deployed airbag is curved towards the side wall section to be covered.

4. The side airbag device according to claim 2, wherein the first or second deployment control mechanism is formed by a gas bag material blank of the airbag being of asymmetrical design.

5. The side airbag device according to claim 2, wherein the airbag includes a first material layer facing a vehicle occupant and a second material layer facing away from the vehicle occupant, and the first and second material layers have different contours and/or are connected asymmetrically.

6. The side airbag device according to claim 5, wherein at least one of the first and second material layers is gathered on one side.

7. The side airbag device according to claim 5, wherein at least one of the first and second material layers is shortened by inserting a material fold.

8. The side airbag device according to claim 7, wherein the material fold is inserted by sewing or gluing.

9. The side airbag device according to claim 5, wherein at least one of the first and second material layers is folded over.

10. The side airbag device according to claim 5, wherein at least one of the first and second material layers includes an additional airbag material.

11. The side airbag device according to claim 10, wherein the additional airbag material is lentil-shaped.

12. The side airbag device according to claim 1, wherein the first and/or second positioning chamber rotates or tilts the usable chamber.

13. The side airbag device according to claim 1, wherein airbag material of the first and/or second positioning chamber and airbag material of the usable chamber lie on different sides of an imaginary line formed by fastening points of the airbag.

14. The side airbag device according to claim 1, wherein the first and/or second positioning chamber forms an additional protective region configured to protect a head of a vehicle occupant from a roof frame of the vehicle.

15. The side airbag device according to claim 1, wherein material layers of the usable chamber are folded together and/or folded in zig-zag form by rollers.

16. The side airbag device according to claim 1, wherein the airbag is accommodated in the side airbag device in such a manner that material layers of the first and/or second positioning chamber are folded in together with material layers of the usable chamber.

17. The side airbag device according to claim 1, wherein the airbag is accommodated in the side airbag device in such a manner that material layers of the first and/or second positioning chamber are entirely or partially wound around the folded-together material layers of the usable chamber.

* * * * *